US005770183A

United States Patent [19]
Linares

[11] Patent Number: 5,770,183
[45] Date of Patent: Jun. 23, 1998

[54] HIGH SPF (30 AND OVER) WATERPROOF SUNBLOCK COMPOSITIONS

[76] Inventor: Francisco J. Linares, 16363 NW. 49th Ave., Miami Lakes, Fla. 33014

[21] Appl. No.: 690,898

[22] Filed: Aug. 1, 1996

[51] Int. Cl.⁶ .............................. A61K 7/42; A61K 7/00; B01J 13/00
[52] U.S. Cl. .............................. 424/59; 424/60; 424/400; 424/401; 514/844; 514/846; 514/847; 514/873; 514/937; 514/938; 252/309
[58] Field of Search .............................. 424/59, 60, 400, 424/401; 514/844, 846, 847, 873, 937, 938; 252/309

[56] References Cited

U.S. PATENT DOCUMENTS

| | | | |
|---|---|---|---|
| 4,804,531 | 2/1989 | Grollier | 424/47 |
| 4,806,344 | 2/1989 | Gaskin | 424/59 |
| 4,839,167 | 6/1989 | Yamamoto et al. | 424/70.1 |
| 5,000,945 | 3/1991 | Kobayashi et al. | 424/59 |
| 5,041,281 | 8/1991 | Strobridge | 424/59 |
| 5,143,722 | 9/1992 | Hollenberg et al. | 424/63 |
| 5,204,090 | 4/1993 | Han | 424/59 |
| 5,208,011 | 5/1993 | Vaughan | 424/59 |
| 5,209,923 | 5/1993 | Nichols | 424/59 |
| 5,215,749 | 6/1993 | Nicoll et al. | 424/401 |
| 5,216,033 | 6/1993 | Pereira et al. | 514/844 |
| 5,256,403 | 10/1993 | Gaskin | 424/59 |
| 5,292,503 | 3/1994 | Raleigh et al. | 424/59 |
| 5,306,485 | 4/1994 | Robinson et al. | 424/59 |
| 5,384,115 | 1/1995 | Bissett et al. | 424/59 |

*Primary Examiner*—Shelley A. Dodson
*Attorney, Agent, or Firm*—Longacre & White

[57] ABSTRACT

A waterproof water-in-oil emulsion, wherein the aqueous phase consists predominately of deionized water and the oil phase includes sunscreen active ingredients, silicone emulsifiers, oil soluble solubilizers and skin conditioning agents. The emulsion provides sun protection higher than SPF 30 and is characterized in that the mean particle size of the oil phase ingredients is 2.0 Microns ($\mu$). The particles of the emulsion are uniformly distributed and substantially of the same size to reduce gaps between particles thus reducing the amount of skin left exposed to ultra violet radiation. A method of manufacturing the emulsion is also disclosed.

2 Claims, 2 Drawing Sheets

HIGH SPF (30 AND OVER) WATERPROOF SUNBLOCK COMPOSITIONS

BACKGROUND OF THE INVENTION

1. Field of the Invention

The present invention relates to water-in-oil emulsions in the form of a cream or a lotion which provide sun protection for human skin during sun exposure. The present invention relates to the sunblock composition and method of manufacture as disclosed in applicants provisional application, Ser. No.: 60/001,815 filed Aug. 1, 1995, and is incorporated herein by reference.

2. Description of the Prior Art

Traditionally products formulated to provide high SPF protection utilize very high concentrations of sunscreen active ingredients. Sunscreen active ingredients are usually irritating to the skin even if applied in small dosages while the sunblock ingredients give a chalky appearance to the skin becoming more pronounced with increases in dosage. In the concentrations traditionally necessary to achieve SPF protection of 30 and over these ingredients produce a very high degree of discomfort, itching, stinging, slim rashes and severe allergy reaction.

It has been established that sunblock compositions must fulfill a series of requirements in order for them to be effective. First and foremost they must protect the skin from the damaging effects of sunlight. This is accomplished through the absorption and or scattering of ultraviolet light (radiation) to prevent sunburn, irreversible skin damage and premature aging. The compositions must also remain active on the skin for prolonged periods of time and be resistant to wash off effect, caused by water related activities and natural perspiration, to provide protection from sun exposure which could last several hours a day. Furthermore, high SPF sunblock compositions should be safe and non-irritating, particularly when used on infants and children.

Currently known high SPF sunblock lotions need to incorporate into their composition skin conditioning agents to ameliorate irritating effects of the high levels of sunscreen active ingredients necessary to achieve high SPF values. Allergic reactions, however, cannot be prevented in the same way. The only way to reduce them is to reduce the sunscreen active ingredient levels below the skin sensitivity threshold.

Usually high SPF sunblock lotions require many subsequent reapplications to maintain their sunblock efficiency. This is a result of inadequate waterproofing of the composition and/or occlusion or photodegradation of the sunscreen active ingredients caused by the presence of water soluble emulsifies, instability within the composition, chemical interactions, insolubilities, coalescence, shifts in absorption, lack of active ingredient enhancement. Excessive reapplication may lead to skin irritation and allergic reactions. Allergic reactions may also be the results of decomposed active ingredients within in the sunscreen product.

It appears that the higher the concentration of sunscreen active ingredients in the composition the higher the risk of complications arising from the decomposition of the sunscreen active ingredients and their possible subsequent absorption into the skin.

Additional irritation potential may arise from a high PH value, incorporating fatty acid soaps, film forming polymers, and an overload of wax components to deposit and maintain the active ingredients on the surface of the skin.

U.S. Pat. No. 5,216,033 to Pereira et al. discloses a water-in-silicone oil transparent emulsion suitable for topical application to the skin and is incorporated herein by reference. However, this reference fails to disclose the careful selection of ingredients to reduce particle size and achieve uniform distribution of particles. Because the '033 reference has a higher concentration of silicone oils, the solubility of sunscreening active ingredients is hampered thus reducing the overal screening effect of the soliution.

U.S. Pat. No. 4,804,531 to Grollier discloses a cosmetic screening composition containing a UV screen in combiniation with a polymer obtained by ploymerization in emulsion and is incorporated herein by reference. However, the '531 reference suffer from the drawback that after partial neutralization of the polymer, particle size and distribution is no longer relevant. The composition of '531 to Grollier does not provide an effective waterproofing vehicle.

The object of the present invention is, therefore, to improve on the drawbacks of the prior art and to provide a sunscreen with small and uniform distribution of active particles, and a method of manufacturing such a sunscreen which requires lower concentrations of active ingredients while increasing the screening effect of the lotion.

SUMMARY OF THE INVENTION

The present invention is a waterproof water-in-oil emulsion, wherein the aqueous phase consists predominately of deionized water and the oil phase includes sunscreen active ingredients, silicone emulsifiers, oil soluble solubilizers and skin conditioning agents. The emulsion provides sun protection higher than SPF 30 and is characterized in that the mean particle size of the oil phase ingredients is 2.0 Microns ($\mu$). As a result of the use of a 2.0$\mu$ mean particle size, a high protection level is achievable while using the minimum effective levels of at least three of the sunscreen components selected from a group consisting of: oxybensone (2.0–6.0%), sulisobensone (5.0–10.0%), dioxybensone (3.0%), menthyl anthranilote (3.5–5.0%), aminobenzoic acid (5.0–15.0%), amyl dimethyl PABA (1.0–5.0%), 2-ethoxyethyl p-methoxy cinnamate (1.0–3.0%), diethamolamine p-methoxy cinnamate (8.0–10.0%), digalloyl trioleate (2.0–5.0%), ethyl 4-bis (hydroxypropyl) aminobenzoate (1.0–5.0%), 2-Ethylhexyl2-cyano-3 3-diphenylacrylate (7.0–10.0%), Ethylhexyl p-methoxy cinnamate (2.0–7.5%), 2-ethylhexyl salicylate (3.0–5.0%), Glyceryl Aminibenzoate (2.0–3.0%), Homomenthyl Salicylate (4.0–15.0%), lawsome with dihydroxyacetone (3.0%), octyldimethyl PABA (1.4–8.0%), 2-phenylbenzimidazole-5-sulfonic acid (1.0–4.0%), triethanolamine salicylate (5.0–12.0%), red petrolatum (30.0–100%), and titanium dioxide (2.0–25.0%). Low concentration levels of used sunscreen components lower specifically chances of skin irritation or allergic reaction by a person using the emulsion. The slelection of ingredients is based on their solubility coefficients to maximize the solubility of the sunscreen active ingredients in the overall solution and to acieve a uniform and small particle distribution.

DETAILED DESCRIPTION OF THE INVENTION

Figure 1:
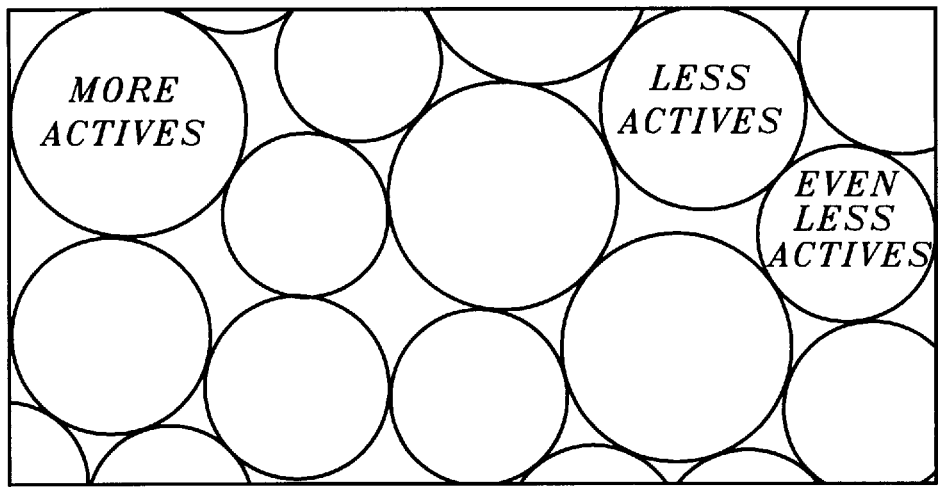
FIG. 1 is a diagram of the particle distribution of the sunscreen of the prior art.

The present invention is a water-in-oil emulsion which is highly waterproof. This property is accomplished through the use of silicone emulsifiers which are water-insoluble and water-repellant. High sun protection which the emulsion provides is due to the fact that $2\mu$ mean particle size of the oil phase ingredients allows for even distribution and consequently for greater coverage and protection of the skin while using low concentration levels of sunscreen components. The aqueous phase constitutes from about 35% to about 95% by weight, preferably from about 55% to about 85% by weight, while the oil phase consists from about 5% to about 65% by weight preferably from about 15% to about 45% by weight. Either phase may be the outer phase of the emulsion, however in the preferred embodiment the oil phase is the outer phase.

The predominant aqueous phase ingredient is water. Other ingredients of the aqueous phase constitute from 10% to about 65% by weight of the emulsion, preferably from about 1% to about 10% by weight of the emulsion.

The aqueous phase comprises such ingredients as NaCl (an electrolyte) in the amount of a about 0.1% to about 1.0% by weight of the emulsion, preservatives such as diazolidinyl urea, methyl paraben, and other water dispersible preservatives from about 1% by weight of the emulsion. Other constituents of the aqueous phase may be water soluble or dispensable fragrances, dyes, extracts, solubilizers. Humectants and skin conditioning agents in the amount from about 0.1% to about 1% by weight of the emulsion, which are present to enhance the emulsion's natural skin conditioning properties.

The oil phase comprises one or more sunscreen components, silicone emulsifiers, oil-soluble solubilizers (emollients), high melting point wax stabilizers and skin conditioning agents. The oil phase of the present invention constitutes from about 1% to about 35% by weight of the active ingredients of the sunscreen lotion and preferable between 1–10.0% of the emulsiuon. The present invention contemplates the use of at least one of the ingredients listed in the Summary of the Invention. These components absorb or scatter ultraviolet light in the tanning or burning range of approximately 290 to approximately 320 nanometers. Silicone emulsifiers alone or with other emulsifiers constitute from about 0% to about 10% by weight of the emulsion. Preferably, silicone emulsifiers comprise from about 1% by weight to about 5% by weight of the emulsion.

Oil soluble solubilizers or emollients comprise from about 0% to about 20% by weight of the emulsion, preferably from about 1% to about 10% by weight of the emulsion. The solubilization, distribution and particularization of sunscreen components is of great importance to the effectiveness of the emulsion. The increase of viscosity of the emulsion is directly related to the selected ingredients and the final particle size of the emulsion. In order to achieve proper distribution of the sunscreen active ingredients it is necessary to build up the final viscosity of the emulsion very slowly. Lower molecular weight emolients having moderate polarity yield the right viscosity and stability to the emulsion. Emollients of very strong or very weak polarit may affect the optimum performance of the sunscreen active ingredients at specific wavelengths by shifting the absorption coefficient of the sunscreen active ingredient and may also affect the stability of the emulsion. Emollients contemplated in this invention include isopropyl myristate, isopropyl palmitate, coco-caprylate or caprate, octyl stearate and cetearyl isononanoate. The oil phase also includes high melting point waxes and polymens that import stability, deposit a protective film on the skin and enhance the waterproofing and extended wear abilities of the emulsion.

High melting point waxes and polymers which can be used in this invention include parafin wax, microcrystalline wax, ceresin wax, hydrogenated castor oil, beeswax, polyethylene, oxidized polyethylene, polypropylene as well as some of the aforementioned copolymers. High melting point waxes and/or polymers constitute from about 0% to about 5% by weight of the emulsion, preferably from about 1% by weight to about 2% by weight of the emulsion. Other ingredients of the oil phase which constitute from about 0.1% by weight to about 5% by weight of the emulsion include oil soluble/dispensable preservatives such as propyl paraben in the amount 0, 15% by weight to about 0, 15% by weight of the emulsion. Antioxidants such as tocopherol (vitamin E) in the amount from about 0. 05% by weight to about 1% by weight of the emulsion to extend the shelf life of the composition as sell as fight free radicals and act as a skin condition and skin protectants. Cocoa butter which constitute from about 0.05% to about 1% by weight of the emulsion may also be used as a skin conditioner.

Additives which are sensitive to temperatures or phase changes, such as fragrance, colorants, plant extracts or biologically active ingredients may also be incorporated into the composition either soon after the emulsion is prepared, before there is a substantial increase in the viscosity of the emulsion or before homogenization. These ingredients can be present in the composition in the amount from about 0% to about 1%. Other beneficial ingredients such as Melanin may also be incorporated into the composition.

Process of Preparation

Normally water-in-oil emulsions are not very stable over a long period of time, especially under heat or freezing stress to assure a highly stable emulsion under the most adverse conditions, the aqueous phase to oil phase ratio has been optimized (70%–80% aqueous phase, 20%–30% oil phase). The viscosity of the oil phase has also been optimized to enhance stability (0.1%–2% viscous oils and/or waxes). The composition is emulsified and then homogenized to specific end-points of from 1 to 3 micron partical size. It is important not to "over-homogenize" the composition in order to maximize its performance.

The present invention allows for flexibility in manufacturing conditions. In the first stage the aqueous phase is slowly incorporated into the oil phase to form a pre-emulsion. The second and final stage of the process consists of homogenization.

The temperature variations of oil and aqueous phases during manufacturing may be as follows:

| AQUEOUS PHASE | | OIL PHASE | |
|---|---|---|---|
| HOT: | 80 C.–90 C. | HOT: | 80 C.–90 C. |
| COLD: | 25 C.–45 C. | HOT: | 80 C.–90 C. |
| HOT: | 80 C.–90 C. | COLD: | 45 C.–55 C. |
| COLD: | 25 C.–45 C. | COLD: | 45 C.–55 C. |

Figure 3:
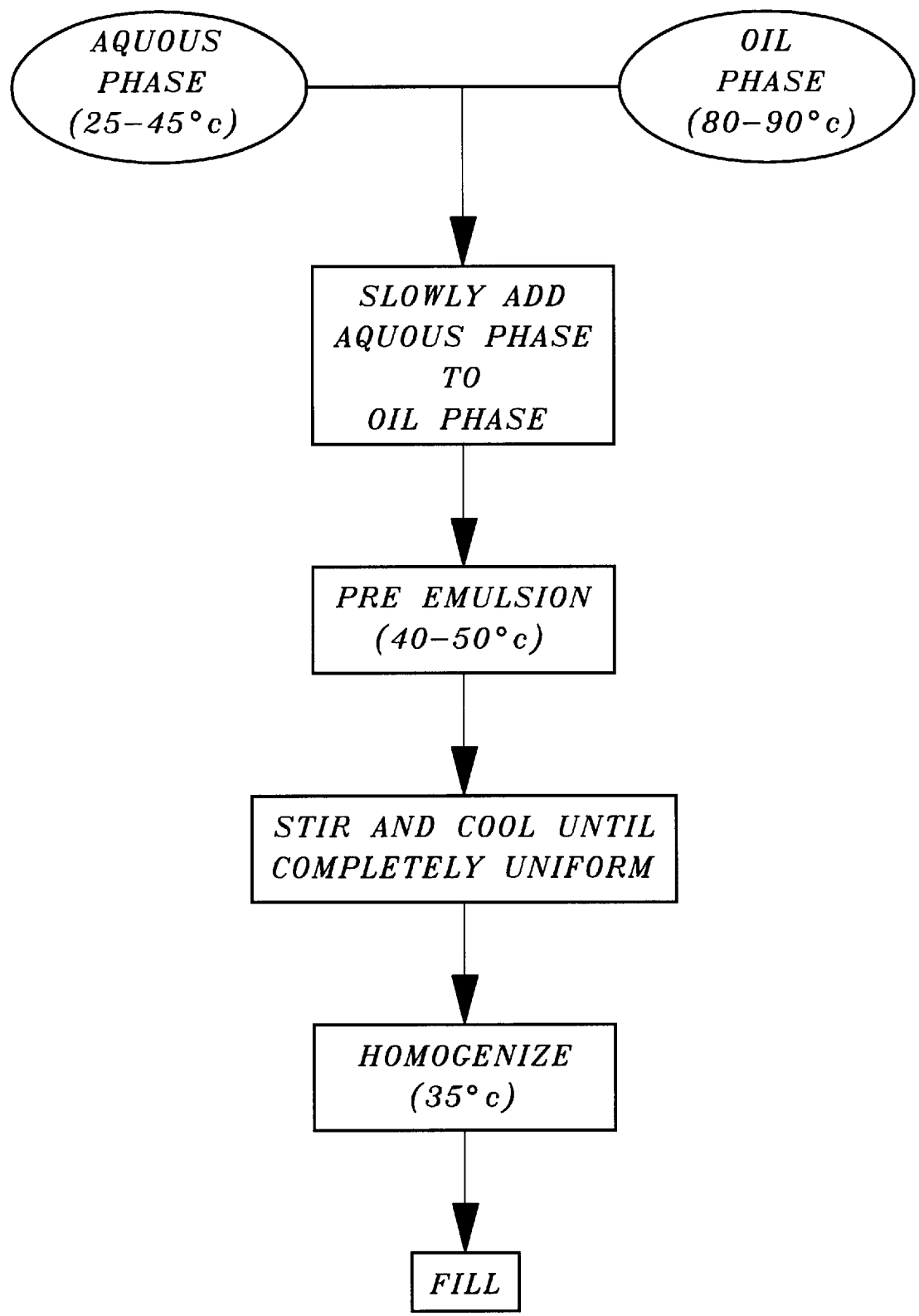
FIG. 3 is a diagram representing the steps of manufacturing a sunscreen according to one embodiment of the present invention.

The preferred temperature of the aqueous phase is between 25°–45° C. and the oil phase between 80°–90° C. when these solutions are added to one another. The preferred manufacturing procedure for the present invention is shown in FIG. 3 and indicates preferred temperatures for each step of the process.

Examples of the Composition of the aqueous and oil phase solutions are listed in the following tables:

TABLE 1

(AQUEOUS PHASE)
Percent of emulsion by weight

| AQUEOUS PHASE | SPF 30* | SPF 45* |
| --- | --- | --- |
| Deionized water | 72.05 | 72.05 |
| Diazolidinyl area | 0.20 | 0.20 |
| Sodium chloride | 0.70 | 0.70 |
| Tetrasodium EDTA | 0.10 | 0.10 |
| Allantoin | 0.05 | 0.05 |
| Aloe vera gel (10x) | 0.05 | 0.05 |
| Natural soluble collagen | 0.05 | 0.05 |
| Glycerin | 1.00 | 1.00 |
| Propylene glycol | 0.80 | 0.20 |
| Methyl paraben | 0.20 | 0.20 |

Percent of emuision by weight

| OIL PHASE | SPF 30* | SPF 45* |
| --- | --- | --- |
| Cetyl Dimethicone Copolyol Polyglyceryl (4) Isosteorate and Hexyl laurate | 4.00 | 4.00 |
| Cetyl Dimethicone Copolyol | 1.00 | 1.00 |
| Cetyl Dimethicone | 1.00 | 1.00 |
| Octyl Methoxycinnamate | 2.00 | 3.00 |
| octyl Salicylate | 3.00 | 3.00 |
| Benzophenone-3 | 2.00 | 2.00 |
| Minerai Oil | 1.00 | 1.00 |
| Isopropyl Myristate | 8.50 | 8.50 |
| Hydrogenateod Castor Oil | 0.25 | 0.25 |
| Polyethyiene | 1.75 | 1.75 |
| Tocopherol (Vitamin E) | 0.10 | 0.10 |
| Cocoa Butter | 0.10 | 0.10 |
| Propyl Paraben | 0.10 | 0.10 |
| Total weight = | 100.00 | 100.00 |

*Sun protection factor both static and waterproof

The SPF of the two examples listed above was determined on human skin on 20 panels as described in the federal register, volume 43, number 166, Food and Drug Administration entitled "Sunscreen drug products for over-the-counter human use." Part 11, Aug. 25, 1978, pays 38259 through 28269 using xenon arc solar simulator as the UV source. This test was conducted prices to and immediately following an immersion experiment which was carried out under controlled conditions (waterproof testing) as described in the above mentioned FDA monograph. This test was performed by an outside qualified and certified independent laboratory.

Under controlled laboratory conditions the present invention has demonstrated extended year and extended protection characteristics for exceeding the FDA's minimum requirements according to the above mentioned monograph. The SPF value of the present invention was over 95% of its original even after 4 to 5 hours (10:00 an to 3:00 pm) of both static and water-proof testing.

FIG. 1 depicts the particle distribution of a sunscreen lotion in the prior art of a rectangular area of approxiametly 10 c$\mu$ by 5 c$\mu$. The active particles are not evenly distributed, posses a higher possibility of coalescence, and has larger uneven gaps between the particles. These drawbacks all lead to lower SPF values even with higher concentrations of sctive ingredients.

Figure 2:
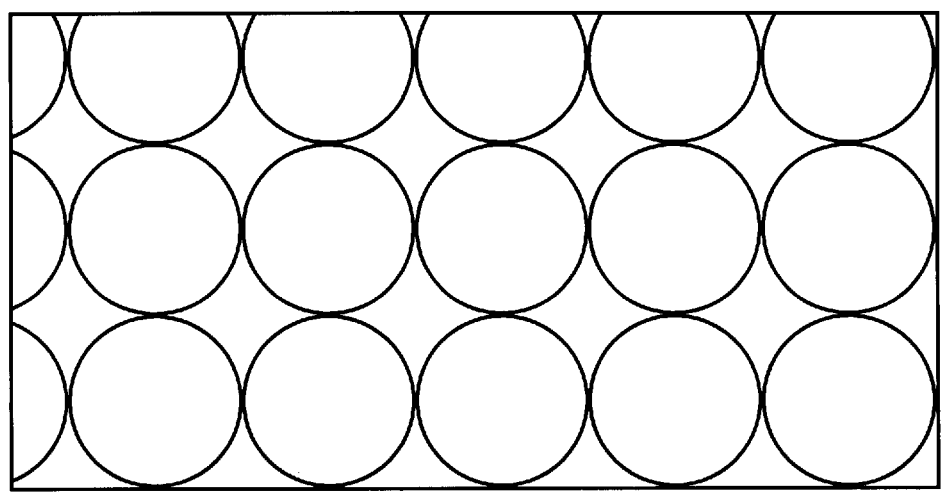
FIG. 2 is a diagram of the particle distribution of the screen according to the present invention.

FIG. 2 depicts the particle distribution of the suncreen lotion of the presen invention over a similar area as that depicted in FIG. 1. The particle size and distribution of the lotion of the present invention is more uniform. Even distribution of active ingredients, smaller particle size (about 20$\mu$), and smaller gaps between particles, all render less exposed unaffected areas. These factors all lead to higher SPF values while utilizing lower concentrations of active ingredients. The use of less active ingredients to achieve the same or higher SPF values reduces the cost of manufacturing a sunscreen lotion as well as requiring application of less lotion to protect a given skin area.

While the sunscreen lotion of this invention has been shown and described with reference to a particular embodiment, it will be understood to those possessing skill in the art that various changes to the form and detail may be made therein without departing from the spirit and scope of the invention.

I claim:

1. An emulsion having an aqueous phase and an oil phase, said oil phase having ingredients comprising at least three components, said components selected from a group consisting of: oxybensone, sulisobensone, dioxybensone, menthyl anthranilote, aminobenzoic acid, amyl dimethyl PABA, 2-ethoxyethyl p-methoxy cinnamate, diethamolamine p-methoxy cinnamate, digalloyl trioleate, ethyl 4-bis (hydroxypropyl) aminobenzoate, 2-Ethylhexyl2-cyano-3 3-diphenylacrylate, Ethylhexyl p-methoxy cinnamate, 2-ethylhexyl salicylate, Glyceryl Aminibenzoate, Homomenthyl Salicylate, lawsome with dihydroxyacetone, octyldimethyl PABA, 2-phenylbenzimidazole-5-sulfonic acid, triethanolamine salicylate, red petrolatum, and titanium dioxide, wherein said aqueous phase constitutes between 35% to 95% of said emulsion by weight.

2. The emulsion according to claim 1, wherein said oil phase consists essentially of:

oxybensone within a range of 2.0–6.0%, sulisobensone within a range of 5.0–10.0%, dioxybensone of 3.0%, menthyl anthranilote within a range of 3.5–5.0%, aminobenzoic acid within a range of 5.0–15.0%, amyl dimethyl PABA within a range of 1.0–5.0%, 2-ethoxyethyl p-methoxy cinnamate within a range of 1.0–3.0%, diethamolamine p-methoxy cinnamate within a range of 8.0–10.0%, digalloyl trioleate within a range of 2.0–5.0%, ethyl 4-bis (hydroxypropyl) aminobenzoate within a range of 1.0–5.0%, 2-Ethylhexyl2-cyano-3 3-diphenylacrylate within a range of 7.0–10.0%, Ethylhexyl p-methoxy cinnamate within a range of 2.0–7.5%, 2-ethylhexyl salicylate within a range of 3.0–5.0%, Glyceryl Aminibenzoate within a range of 2.0–3.0%, Homomenthyl Salicylate within a range of 4.0–15.0%, lawsome with dihydroxyacetone within a range of 3.0%, octyldimethyl PABA within a range of 1.4–8.0%, 2-phenylbenzimidazole-5-sulfonic acid within a range of 1.0–4.0%, triethanolamine salicylate within a range of 5.0–12.0%, red petrolatum within a range of 30.0–100%, and titanium dioxide within a range of 2.0–25.0%.

* * * * *